US006854675B2

(12) United States Patent
Wong

(10) Patent No.: US 6,854,675 B2
(45) Date of Patent: Feb. 15, 2005

(54) ICE-GRINDING DEVICE

(76) Inventor: Yan Kwong Wong, Unit 1016-17, 10/F, Metro Centre Il, Lam Hing Street, Kowloon Bay, Kowloon (HK)

(*) Notice: Subject to any disclaimer, the term of this patent is extended or adjusted under 35 U.S.C. 154(b) by 237 days.

(21) Appl. No.: 10/219,138

(22) Filed: Aug. 15, 2002

(65) Prior Publication Data
US 2003/0034409 A1 Feb. 20, 2003

(30) Foreign Application Priority Data
Aug. 16, 2001 (CN) .................................... 01233473 U

(51) Int. Cl.⁷ ............................................. A47J 43/046
(52) U.S. Cl. .................................. 241/92; 241/DIG. 17
(58) Field of Search ........................... 241/101.1, 101.2, 241/92, DIG. 17

(56) References Cited
U.S. PATENT DOCUMENTS 1,429,348 A * 9/1922 Human ........................ 241/92
3,602,441 A * 8/1971 Alvarez .................... 241/101.2
4,576,016 A    3/1986 Nelson
4,588,136 A    5/1986 Homma
5,273,219 A * 12/1993 Beach et al. .................. 241/65
5,513,810 A    5/1996 Lin

FOREIGN PATENT DOCUMENTS

| CN | 1057899 A | 1/1992 |
| CN | CB2263324 Y | 9/1997 |
| JP | 6 123534 A | 5/1946 |
| JP | 8 159628 A | 6/1996 |

* cited by examiner

Primary Examiner—Mark Rosenbaum
(74) Attorney, Agent, or Firm—Wyatt, Tarrant & Combs, LLP

(57) ABSTRACT

An ice-grinding device comprising a top cover, a helical pressing core, a disk cutter and container, whereby the disk cutter is mountable on the container, the helical pressing core is locatable within the disk cutter, the top cover is mountable on the disk cutter so as to engage the helical pressing core and it is also directly mountable on the container. The ice-grinding device may include means to control the fineness of the processed ice particles. The ice-grinding device may be adapted to process food.

16 Claims, 9 Drawing Sheets

ICE-GRINDING DEVICE

CROSS-REFERENCE TO RELATED APPLICATIONS

This application claims priority of Chinese Application No. 01233473.1X filed Aug. 16, 2001.

STATEMENT REGARDING FEDERALLY SPONSORED RESEARCH OR DEVELOPMENT

Not Applicable

REFERENCE TO A "MICROFICHE APPENDIX"

Not applicable

FIELD OF INVENTION

This invention relates to ice-grinding devices, particularly to ice grinding devices that can be adapted to process food and more particularly to ice grinding devices that can be adapted to cut or mix food.

BACKGROUND OF INVENTION

Conventional ice-grinding devices are adapted for the single purpose of grinding ice. They do not include means to adapt the device so that it can be used for other purposes. To date, only commercial ice-grinding devices are able to control the size and/or fineness of the ice particles produced. This feature is not included in conventional devices suitable for household usage.

SUMMARY OF INVENTION

According to the present invention there is provided an ice-grinding device comprising a top cover, a helical pressing core, a disk cutter and container, the disk cutter is mountable on the container, the helical pressing core is locatable within the disk cutter, the top cover is mountable on the disk cutter so as to engage the helical pressing core and it is also directly mountable on the container.

Preferably, the top cover includes a spindle that protrudes from a centre of an underside of the top cover and a plurality of projections formed on an outer portion of a peripheral edge on an underside of the top cover; the helical pressing core includes a central hollow post to engage securely with the spindle of the top cover and a further hollow post that protrudes from a centre of an underside of the helical pressing core; the disk cutter includes a mounting post to engage freely with the further hollow post of the helical pressing core, an upper portion to receive the peripheral edge of the top cover, a plurality of protruding arcs formed on an inside of an upper portion of the disk cutter to engage securely with the plurality of projections formed on the peripheral edge of the top cover and a plurality of projections formed on an outside of a peripheral edge at a bottom of the disk cutter; and the container includes an upper portion to receive the peripheral edge of the disk cutter and a plurality of protruding arcs formed on an inside of the upper portion of the container to engage securely with the plurality of projections formed on the peripheral edge of the disk cutter.

Preferably, the top cover includes a rotatable handle that is drivably interconnected with the spindle such that when the spindle engages securely with the central hollow post the helical pressing core rotates as the handle rotates.

Preferably, the helical pressing core includes a surface arranged helically around the central hollow post forming a passage along which ice can be pressed so as to move under the rotation of the helical pressing core and an opening in the base of the helical pressing core from which pressed ice may fall.

Preferably, the disk cutter includes an opening through which a selected blade protrudes and ground ice may fall, a blade plate on which a plurality of different blades are disposed, a blade-selecting means to select a particular blade and a blade-locking device to lock the selected blade in position.

Preferably, the blade plate includes a plurality of pressure plates fixed on a plate and a plurality of blades with different rakes whereby a blade is mounted on an upperside of each of the pressure plates and the blade plate co-operates with the blade-selecting means and blade-locking device.

Preferably, the blade-selecting means includes a blade-selecting tab formed on the plate of the blade plate and arranged so that the plate can be moved so the selected blade is positioned adjacent the opening in the disk cutter.

Preferably, the blade-locking device includes an elongate shaft, a small cylindrical portion, a joining part and a blade-locking handle that are arranged so that when the blade-locking handle is rotated the elongate shaft applies pressure to the pressure plate of the selected blade to force the selected blade through the opening in the disk cutter.

Preferably, the top cover includes an opening through which lumps of ice may be fed into the device and a cover shaped to mate with and close the opening.

According to a second aspect of the invention the ice-grinding device is adapted to process food and comprises the top cover, the container and a food processing means, whereby the helical pressing core and disk cutter are removed, the food processing means is located within the container and the top cover is mounted on the container and engages the food processing means.

Preferably, the top cover includes a rotatable spindle that protrudes from a centre of an underside of the top cover, a rotatable handle that is drivably interconnected with the spindle and a plurality of projections formed on an outer portion of a peripheral edge on an underside of the top cover; the food processing means includes a hollow post to engage securely with the spindle of the top cover so that the food processing means rotate as the handle of the top cover rotates and a further hollow post; the container includes a mounting post to engage freely with the further hollow post of the food processing means, an upper portion to receive the peripheral edge of the top cover and a plurality of protruding arcs formed on an inside of the upper portion of the container to engage securely with the plurality of projections formed on the peripheral edge of the top cover.

Preferably, the food processing means comprise a mixing tool to mix food. Alternatively, the food processing means comprise a cutting blade to cut food.

The ice-grinding device of the present invention includes means to control the size and/or fineness of the ice particles produced. The ice-grinding machine can be adapted to process food. The ice-grinding machine is easy to use, requires little strength or electric power.

BRIEF DESCRIPTION OF THE DRAWINGS

An embodiment of the present invention is illustrated in the accompanying drawings, by way of example only, in which.

DETAILED DESCRIPTION OF THE PREFERRED EMBODIMENTS

Figure 1:
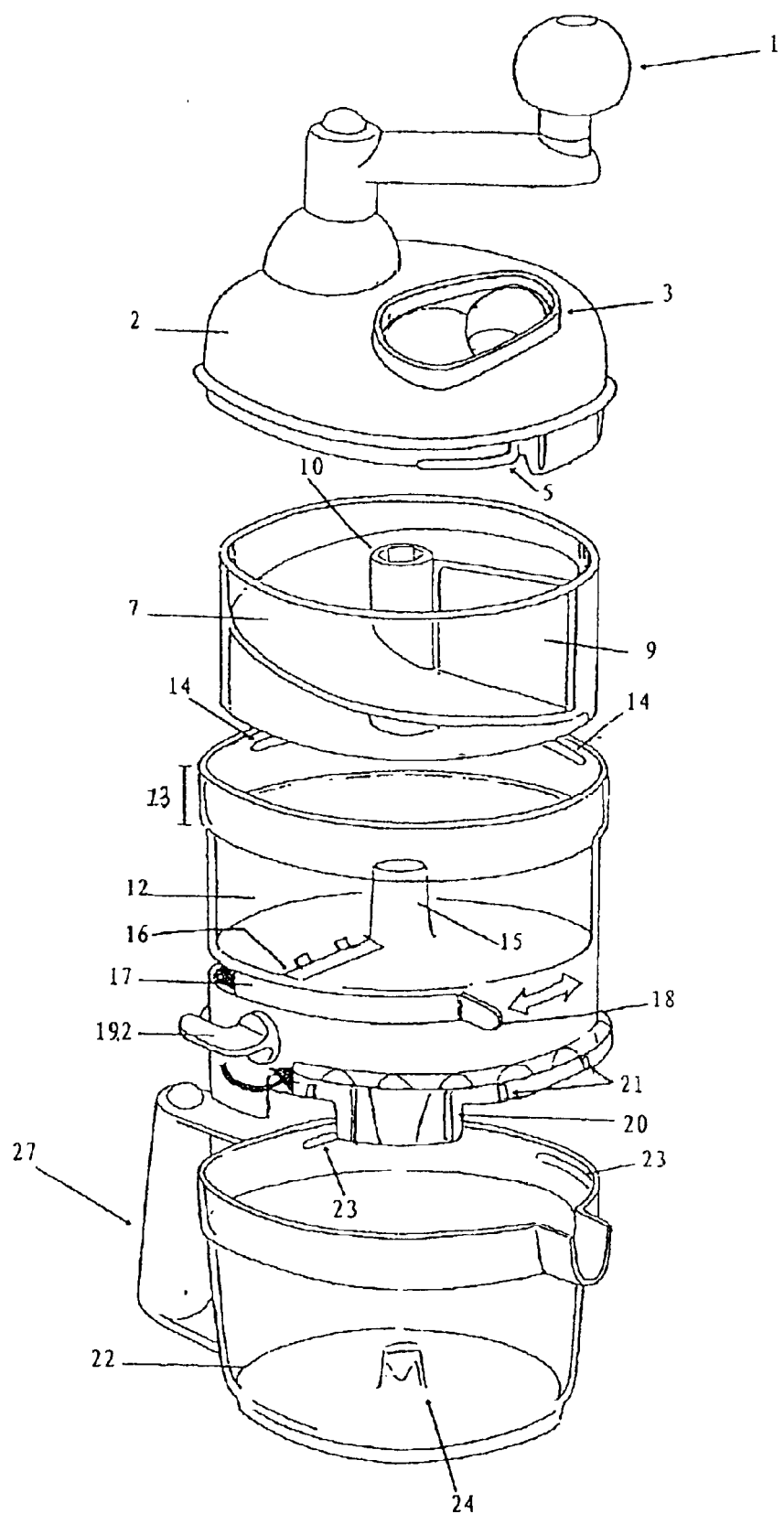
FIG. 1 is an exploded perspective view of various parts of an ice-grinding device of the present invention.

FIG. 1 of the accompanying drawings depicts various parts of an ice-grinding device to grind ice according to the present invention. The ice-grinding device comprises a top cover 2, helical pressing core 7, disk cutter 12 and container 22. FIG. 1 shows that the top cover 2 has a handle 1, an elliptically-shaped opening 3 and a plurality of L-shaped projections 5 formed on a peripheral edge on an underside of the top cover 2. The helical pressing core 7 includes a central hollow post 10, around which a surface is helically arranged, and an outlet 9 formed at a base of the core 7. The disk cutter 12 includes an upper portion 13 in which a plurality of transverse protruding arcs 14 are formed on an inside wall, a lower portion, a central mounting post 15, a rectangular opening 16 through which a blade can protrude and processed ice can fall, a blade plate 17, a blade selecting tab 18, a blade locking handle 19.2, a projecting tab 20 and a plurality of projections 21 formed on a peripheral edge at a bottom of the disk cutter 12. The container 22 includes an upper portion in which a plurality of transverse protruding arcs 23 are formed on an inside wall, a lower portion, a central mounting post 24, a handle 27 and a spout.

Figure 2:
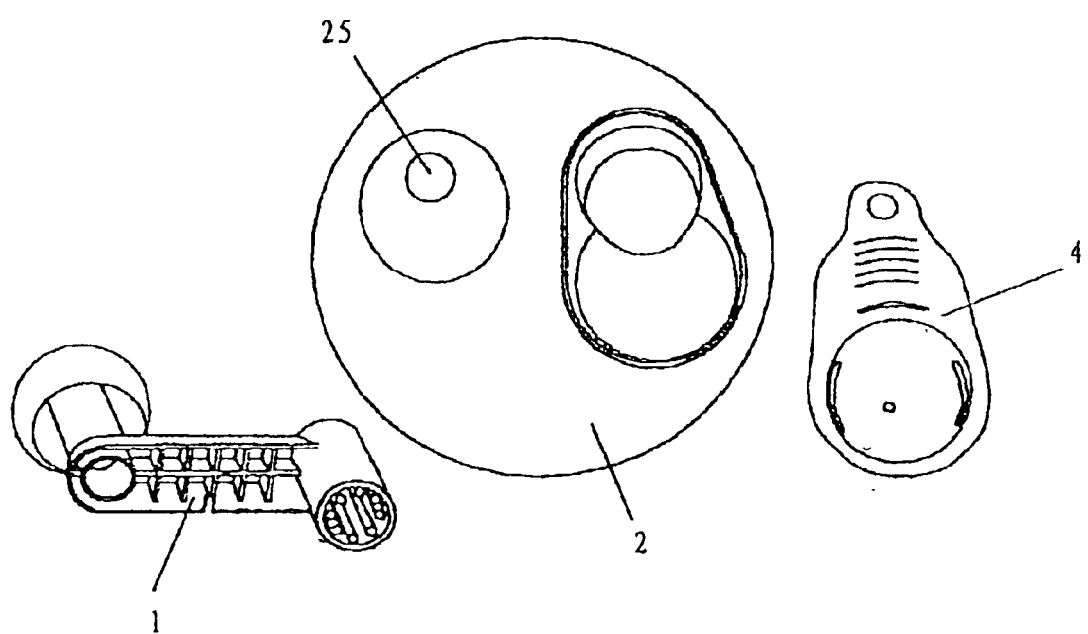
FIG. 2 is an exploded perspective view of various parts of a top cover of the ice-grinding device of FIG. 1.
Figure 3:
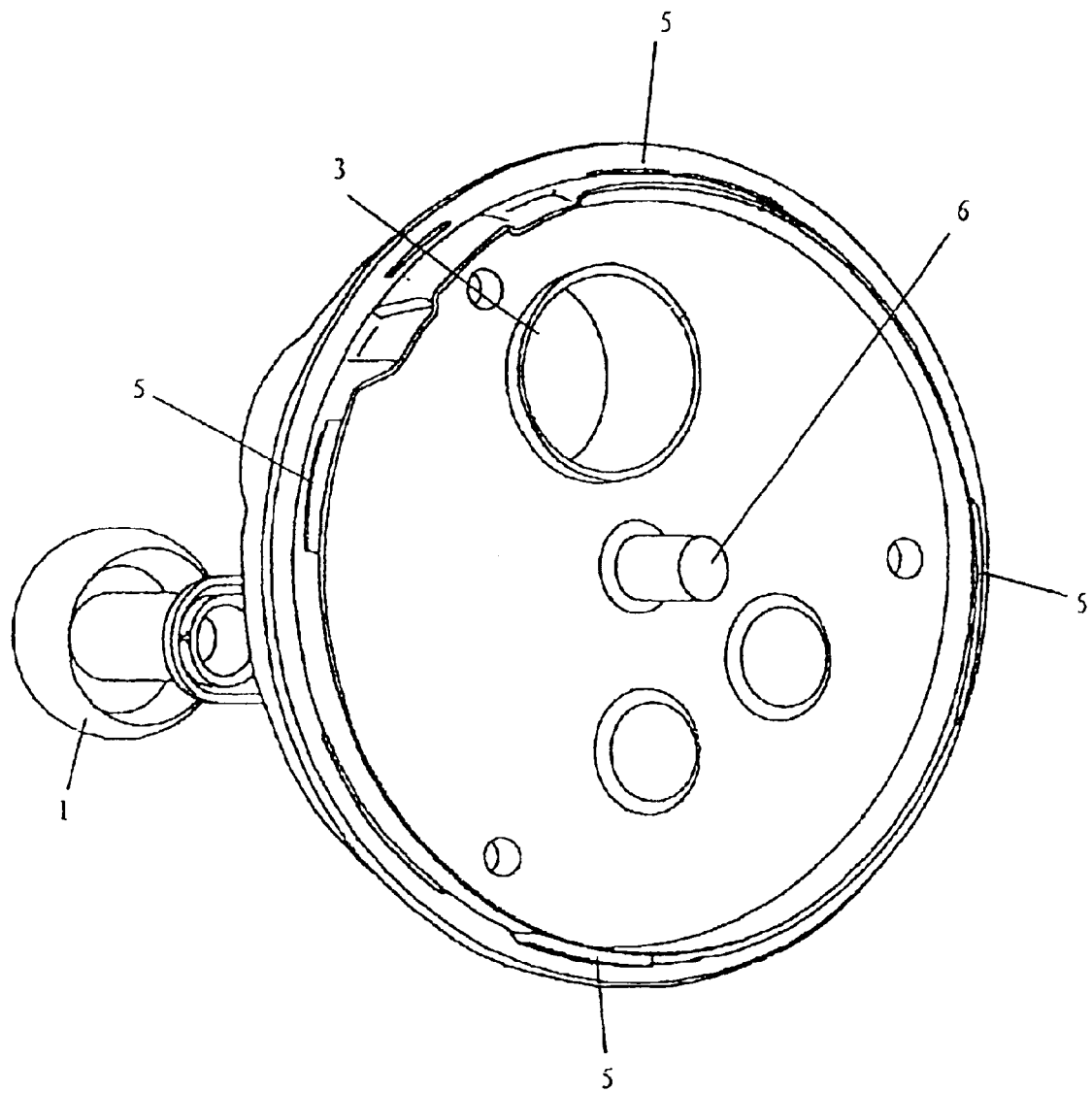
FIG. 3 is a perspective view of an underside of a top cover of the ice-grinding device of FIG. 1.

FIGS. 2 and 3 depict the top cover of the ice-grinding device in more detail. The top cover 2 includes a rotatable handle 1 with a spherical knob. The handle 1 is connected to the top cover 2 using a mounting post 25, which is in turn interconnected to a rotatable hexagonal spindle 6 via a gear transmission system (not shown). As a result, the spindle 6 rotates under the action of the rotation of the handle 1. The spindle 6 protrudes from a centre of an underside of a base of the top cover 2. The spindle 6 is preferably hexagonal in shape. An elliptically-shaped opening 3 is formed within the top cover 2 to allow lumps of ice to be added to the ice-grinding device. The top cover 2 includes a cover 4 that is shaped to mate with the opening 3. The cover 4 is fitted over the opening 3 after the ice has been added or when the ice-grinding device is not in use to prevent debris and dust from entering. Four L-shaped projections 5 are formed on an outer portion of a peripheral edge on the underside of the top cover 2 to provide a locking of top cover 2 to core 7.

Figure 4:
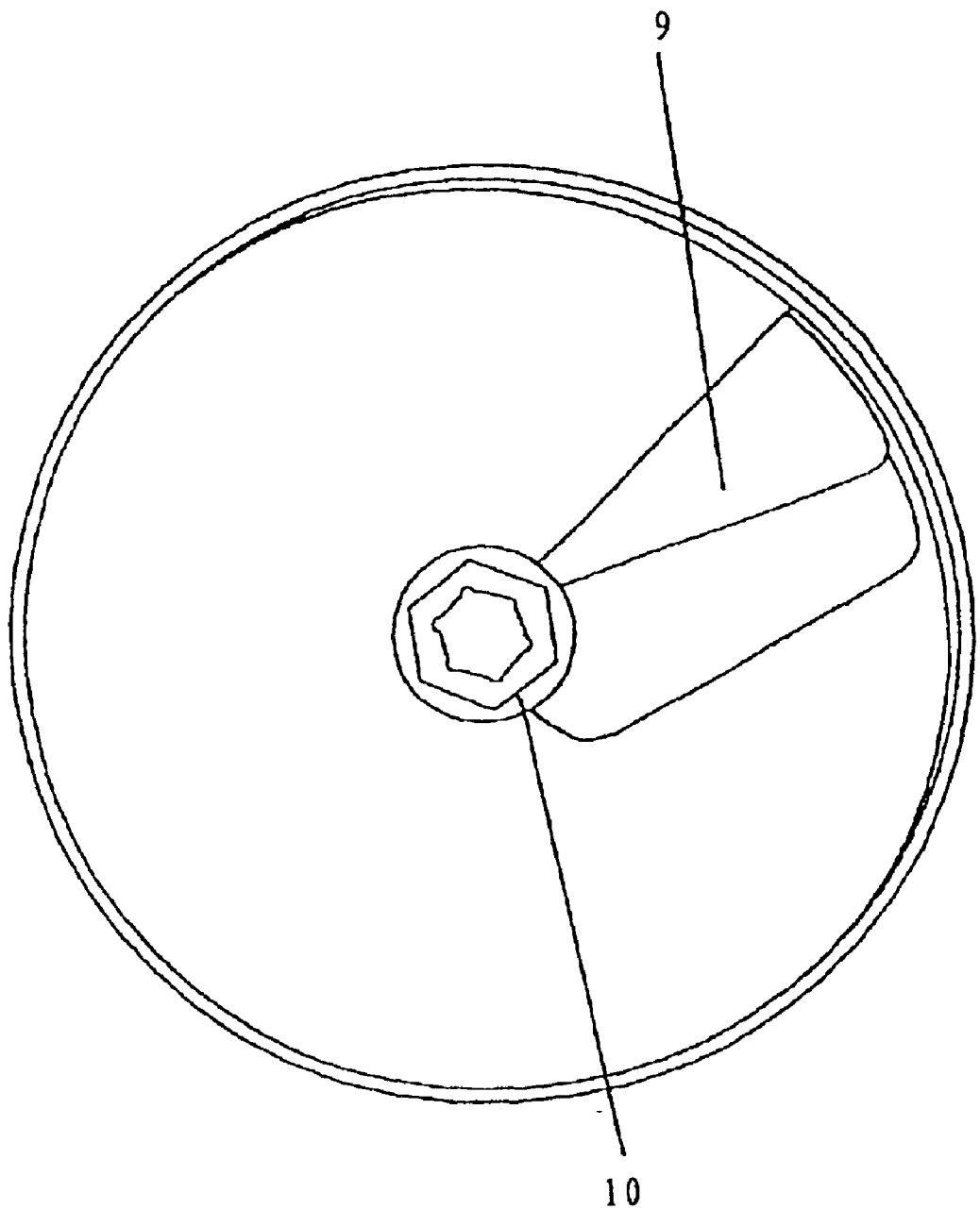
FIG. 4 is a plan view of an upperside of a helical pressing core of the ice-grinding device of FIG. 1.
Figure 5:
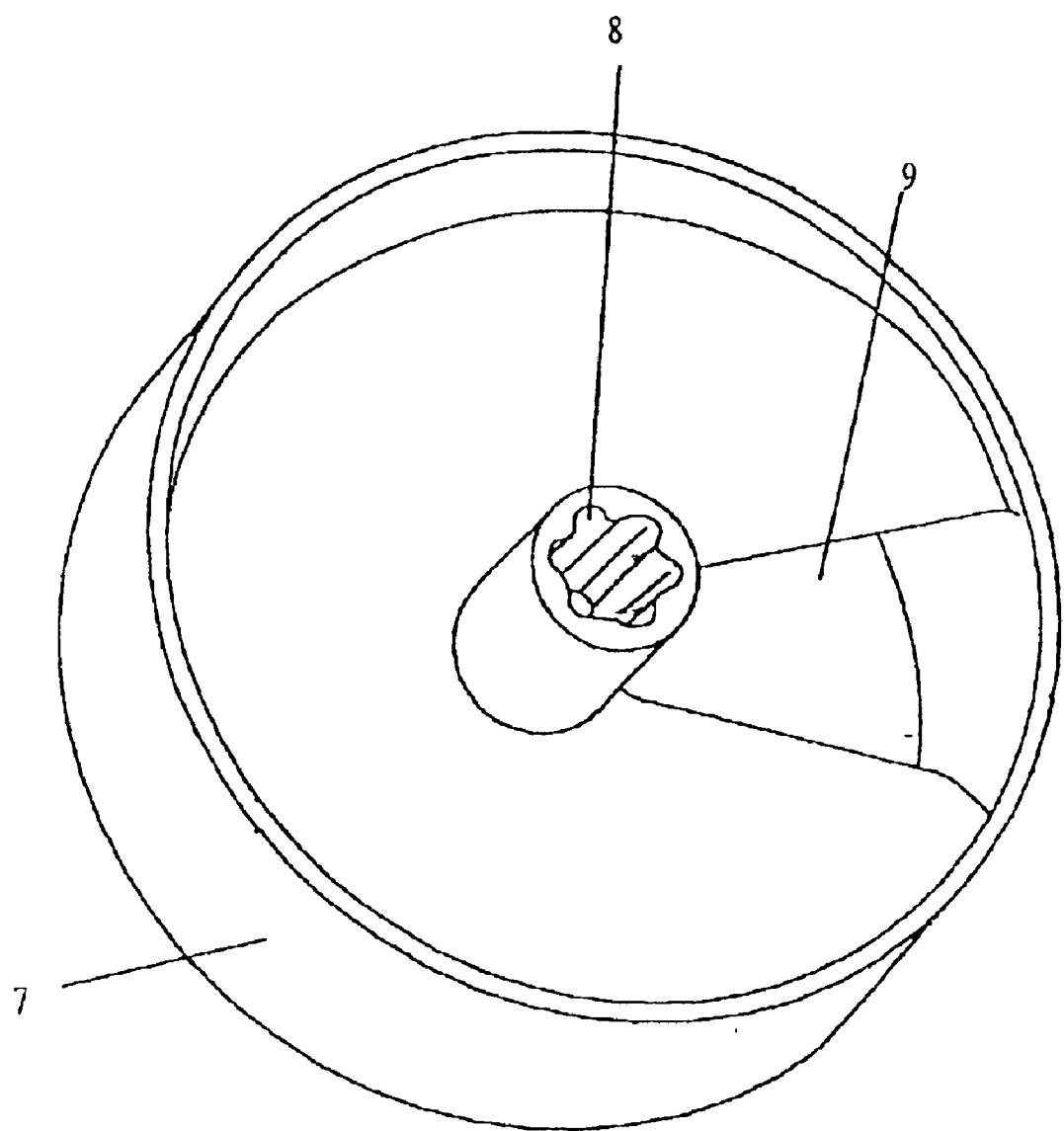
FIG. 5 is a perspective view of an underside of a helical pressing core of the ice-grinding device of FIG. 1.

FIGS. 4 and 5 show that the helical pressing core 7 is generally cylindrical in shape and has a central hollow post 10. A surface 7.1 is arranged helically around the post 10 to provide a downwardly inclined passage for the ice. The ice exits the core 7 through an outlet 9 formed in a base of the core 7. The central hollow post 10 has a hexagonal shaped hole that is dimensioned to receive the hexagonal shaped spindle 6. Thus, when the ice-grinding device is assembled and a user rotates the handle 1 of the top cover 2, the spindle 6 drives the central hollow post 10 so that the entire core 7 is rotated. In the course of this process the core 7 acts as an Archimedes screw. As the core 7 rotates a pressing force acts on the lumps of ice and they move down along the inclined surface 7.1 and out through the outlet 9. A further hollow post 8 protrudes from a centre of a base of the core 7 and extends outwardly from an underside of the core 7. The hollow post 8 has a hexagonal shaped hole.

Figure 6:
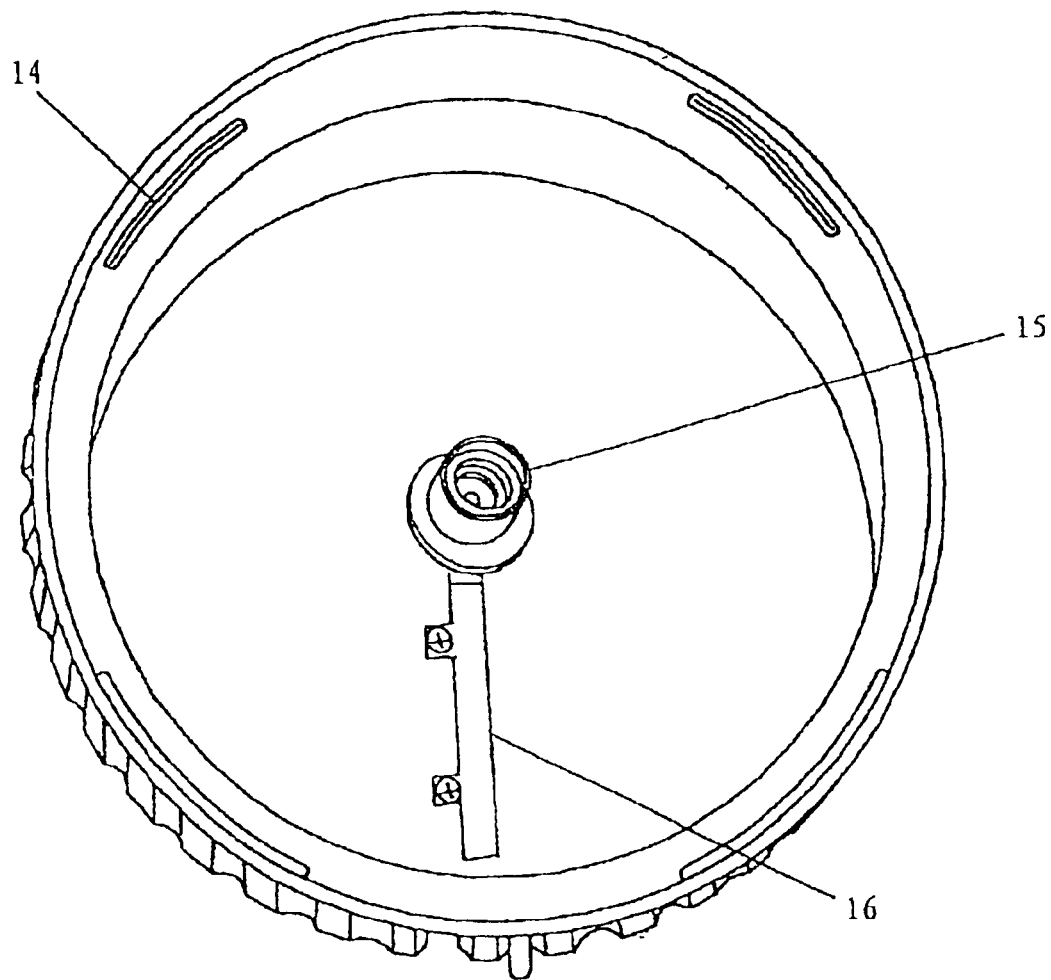
FIG. 6 is a plan view of an upperside of a disk cutter of the ice-grinding device of FIG. 1.
Figure 7:
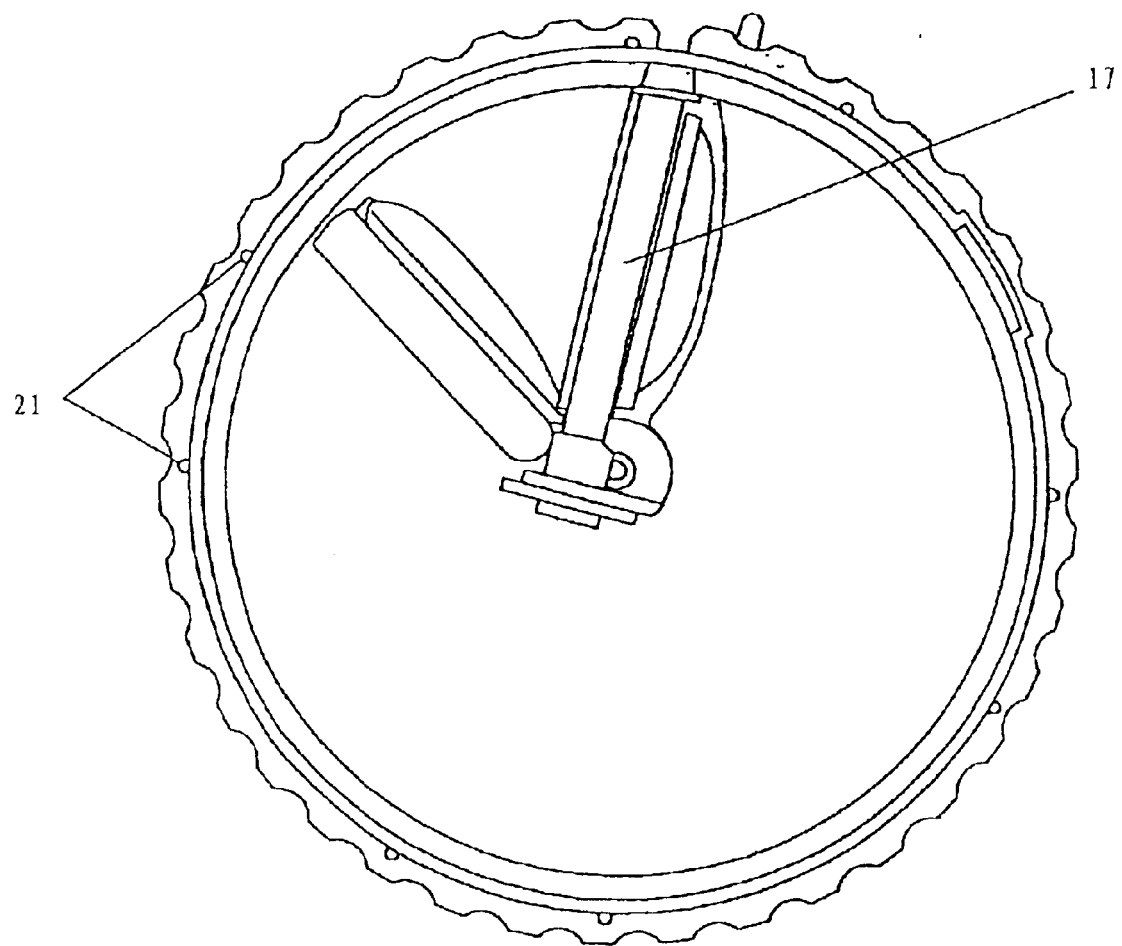
FIG. 7 is a plan view of an underside of a disk cutter of the ice-grinding device of FIG. 1.

The disk cutter 12, depicted in FIGS. 6 and 7, is also generally cylindrical in shape and is dimensioned wholly to receive the core 7. The disk cutter 12 includes a central mounting post 15 that is shaped and arranged to engage with the hollow post 8 extending from the base of the core 7. The transverse sectional area of the hexagonal hole of the hollow post 8 is larger that the transverse sectional area of the mounting post 15. Thus, the hollow post 8 fits easily over the mounting post 15. Consequently, the core rotates 7 around the mounting post 15 when the ice-grinding device is in use. A screw hole 12.1 is provided in a central position on an underside of a base of the disk cutter 12 (not shown).

The disk cutter 12 has an upper portion 13 and a lower portion 13.1. A diameter of a cylinder wall of the upper portion 13 is larger than a diameter of a cylinder wall of the lower part. The upper portion 13 of the disk cutter 12 is shaped and dimensioned to receive the peripheral edge of the underside of the top cover 2. Four transverse protruding arcs 14 are formed on the inside of the cylinder wall of the upper portion 13. The arcs 14 are shaped and arranged to engage with the four L-shaped projections 5 in order to secure the top cover 2. The top cover 2 is locked in place when the peripheral edge is received in the upper portion 13 of the disk cutter and then the top cover is rotated so that the arcs 14 securely engage with the projections 5. Thus, the top cover 2 is unlocked when it is rotated in the opposite direction so that the arcs 14 and projections 5 are released.

A rectangular opening 16 is provided in the base of the disk cutter 12 through which the selected cutting blade 17.1 or 17.2 protrudes and ground ice can fall. FIG. 7 depicts a blade plate 17 with two blades 17.1 and 17.2 disposed on the underside of a base of the disk cutter 12. The blades 17.1 and 17.2 have different rakes so that the ice can be ground into two different sizes of ice particles. Blade 17.1 processes or cuts coarse ice particles whereas blade 17.2 processes or cuts fine ice particles. The disk cutter 12 of the ice-grinding device includes a blade-selecting means 18 to enable a particular blade to be selected so that the fineness of the ice-particles can be controlled. The disk cutter 12 also includes a blade-locking device 19 to securely fasten a blade in position ready for use.

Figure 8:
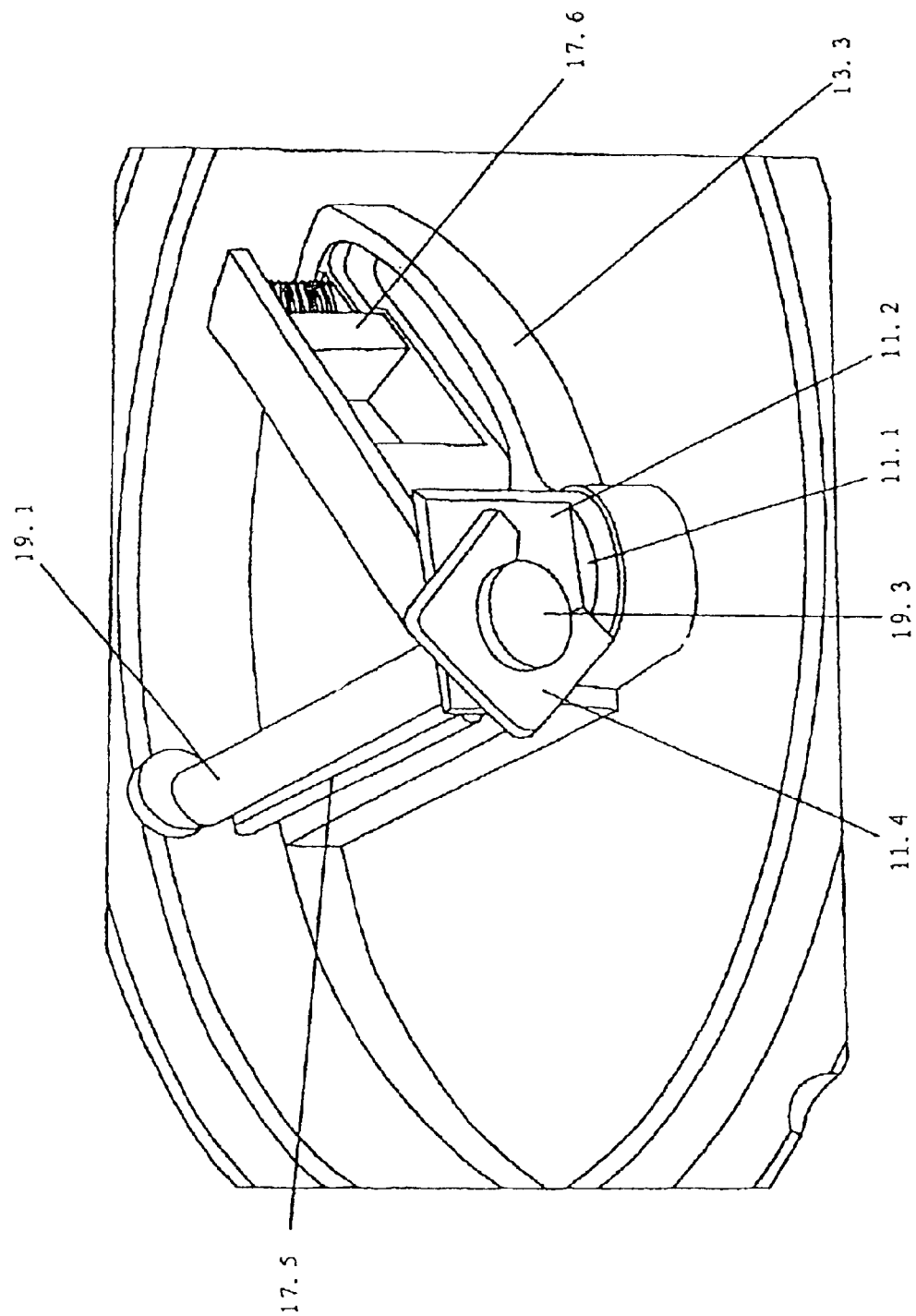
FIG. 8 is a perspective view of a blade plate of the ice-grinding device of FIG. 1.
Figure 9A:
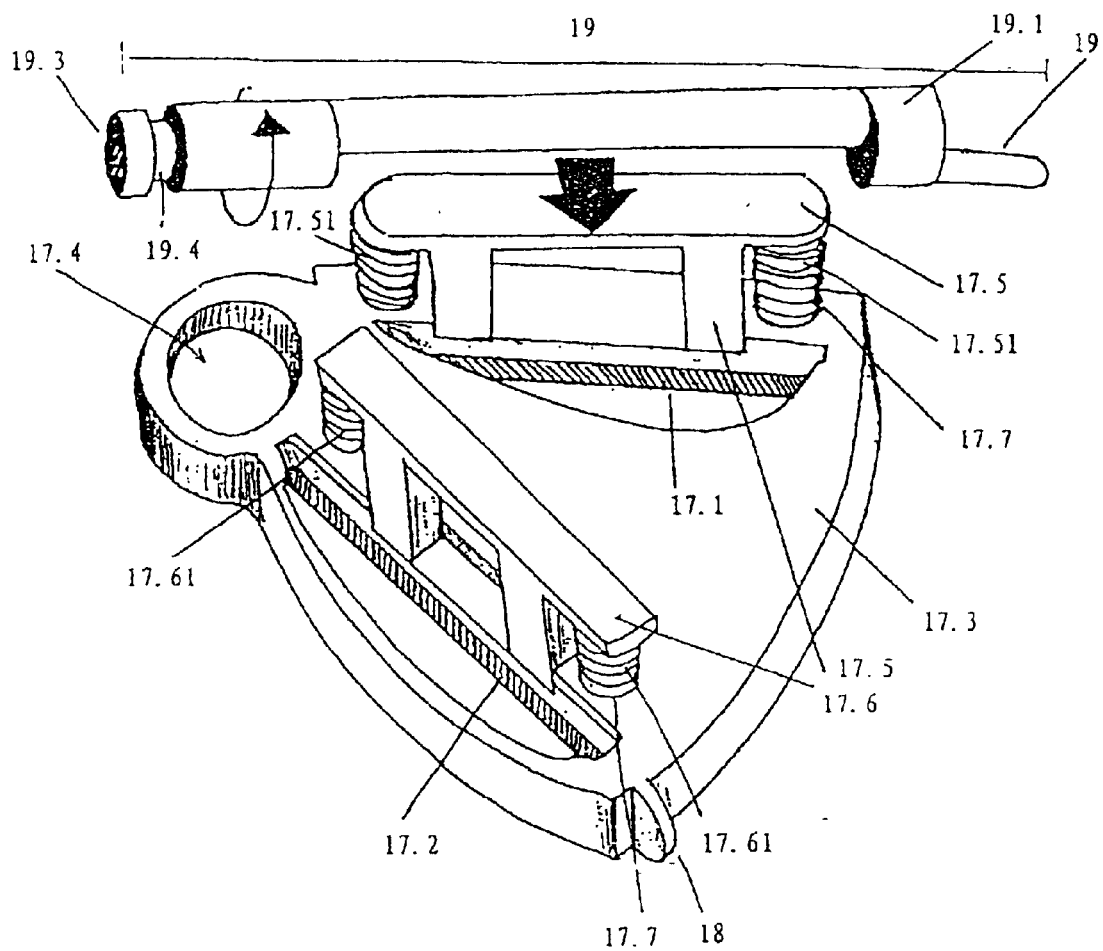
FIG. 9A is an exploded perspective view of a blade plate of the ice-grinding device of FIG. 1.
Figure 9B:
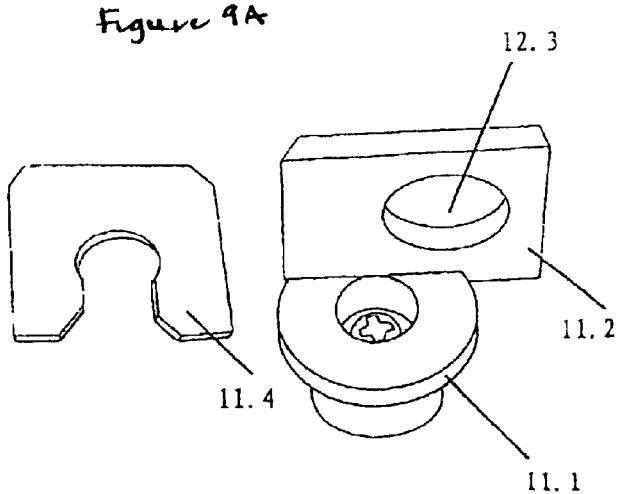
FIG. 9B is an exploded perspective view of a fixing lock of a blade plate of the ice-grinding device of FIG. 1.

FIGS. 8, 9A and 9B show the blade plate 17, blade-selecting means 18 and blade-locking device 19 in more detail. The blade plate 17 includes a sector-shaped plate 17.3, two identical Π-shaped pressure plates 17.5 and 17.6, circular hole 17.4 and fixing lock 11.

As explained below the sector-shaped plate 17.3 is pivotally attached to the disk cutter 12 via the fixing lock 11 through the circular hole 17.4.

The blades 17.1 and 17.2 are attached to a top part of respective pressure plates 17.5 and 17.6. The pressure plates 17.5 and 17.6 are arranged to move up and/or down under pressure so that when a blade is selected by a user using the blade-selecting means 18 and locked in place using the blade-locking device 19, the respective pressure plate 17.5 or 17.6 pushes the selected blade through the opening 16 so that it can grind the ice. Each pressure plate 17.5 and 17.6 includes a pair of cylinders 17.51 and 17.61 respectively, and these are arranged at either end of the pressure plate 17.5 and 17.6. Each cylinder is surrounded by a helical spring 17.7. The springs 17.7 are fixed to the sector-shaped plate 17.3, however the cylinders are freely suspended and are able to pass through holes formed in the sector-shaped plate 17.3 (not shown). As a consequence, the pressure plates are able to rise and fall when a force is applied or removed.

The fixing lock 11, shown in FIG. 9B, comprises a cylindrical portion 11.1, a rectangular plate 11.2 and a locking piece 11.4. The cylindrical portion 11.1 interconnects the blade plate 17 and disk cutter 12. The rectangular plate 11.2 is arranged perpendicular to the cylindrical portion 11.1 and includes a circular hole 11.3 through which a small cylindrical portion 19.3 of an elongate shaft 19.1 passes. The locking piece 11.4 locks the small cylindrical portion 19.3 of the elongate shaft 19.1 in place.

The blade plate 17 is pivotally attached to the disk cutter 12 using the cylindrical portion 11.1 of the fixing lock 11 and a screw. The circular hole 17.4 of the blade plate 17 is placed over the screw hole 12.1 on the underside of the base of the disk cutter 12. Part of the cylindrical portion 11.1 is slotted into the circular hole 17.4 and secured to the disk cutter 12 using a screw 12.1. Since a diameter of a section of the cylindrical portion 11.1 that slots through the circular hole 17.4 is smaller than that of the circular hole 17.4 movement of the blade plate 17 is not hindered. A point at which the blade plate 17 and disk cutter 12 are connected is effectively a pivot point.

The blade-selecting means 18 include a semi-circular blade-selecting tab 18.1 formed at one end of an edge of the sector-shaped plate 17.3 (see FIG. 9A). When the ice-grinding device is assembled the blade-selecting tab 18.1 protrudes through an opening in the cylinder wall of the lower part of the disk cutter 12 (see FIG. 1). A user of the ice-grinding device selects a particular blade 17.1 or 17.2 by moving the blade-selecting tab 18.1 from right to left or left to right. When the blade-selecting tab 18.1 is moved to the left the sector-shaped plate 17.3 pivots to the left such that the pressure plate 17.7 is placed adjacent the opening 16 in the base of the disk cutter 12. The blade-locking device 19 then moves the blade 17.2 attached to the top of the pressure plate 17.6 into a usable position. When the blade-selecting tab 18.1 is moved to the right the sector-shaped plate 17.3 pivots to the right such that the pressure plate 17.5 is placed adjacent the opening 16 in the base of the disk cutter 12. The blade-locking device 19 then moves the blade 17.1 attached to the top of the pressure plate 17.5 into a usable position.

The blade-locking device 19 comprises an elongate shaft 19.1, a small cylindrical portion 19.3, a joining part 19.4 and a blade-locking handle 19.2. When the blade-locking device 19 is assembled the small cylindrical portion 19.3 formed at one end of the elongate shaft 19.1 passes through the circular hole 11.3 of the fixing lock 11 and is locked in place by the locking piece 11.4 so it can no longer be withdrawn. The blade-locking handle 19.2 extends through an opening 19.2 in a cylinder wall of the lower part of the disk cutter 12 (see FIGS. 1 and 8). The blade-locking device 19 is designed so that a user can rotate the locking handle 19.2 to move the elongate shaft 19.1 into a position so that it places pressure on the pressure plate 17.5 or 17.6 of the selected blade. When the pressure plate 17.5 or 17.6 is placed under pressure the selected blade is pushed up through the opening 16 in the base of the disk cutter 12 so that it can grind ice.

Thus, after selecting a blade 17.1 or 17.2 to process or cut ice particles the blade-locking handle 19.2 is rotated from left to right. The elongate shaft 19.1 moves across and pushes against the pressure plate 17.5 or 17.6 of the selected blade 17.1 or 17.2. The helical springs 17.7 are compressed and push the pressure plate 17.5 or 17.6 upwards towards the opening 16. As a result the selected blade 17.1 or 17.2 protrudes out of the opening 16 so that it can grind ice to the requisite particle size. When the ice-grinding device is no longer in use or the user wishes to change the blade 17.1 or 17.2 the blade-locking handle 19.2 is rotated from right to left to release the pressure plate 17.5 or 17.6, withdraw the blade 17.1 or 17.2 from the opening 16 and restore it to its original state.

FIG. 1 shows that a projecting tab 20 projects downwardly from the peripheral edge at the bottom of the disk cutter 12. Eight small projections 21 are formed on the outside of the same peripheral edge. The eight small projections 21 are grouped into four sets. The distance between the two small projections 21 of each set is equal to the length of the transverse protruding arcs 23 of the container 22.

The container 22 is similar to the disk cutter 12 in that it is generally cylindrical in shape, it includes an upper portion and lower portion and a diameter of a cylinder wall of the upper portion is larger than a diameter of a cylinder wall of the lower portion. The upper portion of the container 22 is shaped and dimensioned to receive the peripheral edge of the bottom of the disk cutter 12. Four transverse protruding arcs 23 are formed on an inside of the cylinder wall of the upper portion. The arcs 23 are shaped and arranged so that the can engage with the four sets of two projections 21 on the outside of the peripheral edge of the bottom of the disk cutter 12. The disk cutter 12 is locked in place when peripheral edge of the disk cutter 12 is received in the upper portion of the container 22 and the disk cutter 12 is rotated so that the arcs 23 engage with the two projections 21 of each of the four sets of projections. The disk cutter is unlocked by rotating it in the opposite direction so that the arcs 23 and projections 21 are released. The container 22 includes a mounting post 24 that stands upright from a centre of a base of the container 22. A handle 27 is provided on the outside of the container so that it can be carried or its contents can be tipped out easily via a spout formed in the upper portion of the container 22.

The installation of the ice-grinding device shall now be described:

The manual handle 1 is connected to the top cover 2 by mounting it on the mounting post 25. The helical pressing core 7 is place within the disk cutter 12 and secured by mounting the hollow post 8 of the core 7 over the mounting post 15 of the disk cutter 12. The blade 17.1 or 17.2 is selected and fixed in position so that it protrudes through the opening 16 in the base of the disk cutter using the blade-selecting means 18 and blade-locking means 19 as described in detail above. The top cover 2 is securely mounted on the disk cutter 12 by placing the peripheral edge of the top cover 2 within the upper portion 13 of the disk cutter 12 and engaging the four projections 5 of the top cover 2 with the four arcs 14 of the disk cutter 12. The disk cutter 12 is securely mounted on the container 22 by placing the peripheral edge of the disk cutter 12 within the upper portion of the container and engaging the four sets of two projections 21 with the four arcs 23 of the container 22.

The operation of the assembled ice-grinding device shall now be described:

Lumps of ice are fed into the ice-grinding device through the opening 3 of the top cover 2. As the handle 1 of the top cover 2 is rotated the spindle 6 rotates due to the gear transmission system. The spindle 6 drives the hollow post 10 of the core 7 so that the entire core 7 rotates within the disk cutter 12. The rotating action of the core 7 provides a pressing force on the lumps of ice so that they move downwardly through the helical passage in the core. As the lumps of ice exit the outlet 9 in the base of the rotating core 7 and pass over the blade 17.1 or 17.2 they are ground into ice particles. The ice particles then fall through the opening 16 into the container 22.

The ice-grinding device may be adapted to cut or mix foodstuffs. The helical pressing core 7 and disk cutter 12 are replaced with either a cutting blade 29 or mixing tool 28 that is positioned within the container 22. The cutting blade 29 and mixing tool 28 include a hollow post that is shaped to engage with the spindle 6 of the top cover 2 and a hollow post that is shaped to engage with the mounting post 24 of the container 22. As a result the cutting blade 29 and mixing tool 28 can be mounted within the container 22 and rotated under the action of the spindle 6. The top cover 2 and container 22 of the ice-grinding device are shaped and dimensioned so that the top cover can be mounted directly onto the container 22 and locked in place. The upper portion of the container 22 is shaped and dimensioned so that it can receive the peripheral edge of the top cover 2. Furthermore, the four transverse protruding arcs 23 on the inside of the wall of the upper portion are shaped and arranged to securely engage with the four L-shaped projections 5 on the outside of the peripheral edge of the top cover 2. Foodstuff is fed into the device through the inlet in the top cover 2. As the handle 1 rotates the spindle 6 rotates due to the gear transmission system. The spindle 6 drives the cutting blade 29 or mixing tool 28 so that the food is sliced or mixed. The processed food is held within the container 22.

It is appreciated that the above-described ice-grinding device represents a preferred embodiment of the present invention. Various modifications may be made to the ice-grinding device without departing from the scope of the present invention.

The preferred features of the invention are applicable to all aspects of the invention and may be used for any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

What is claimed is:

1. An ice-grinding device comprising a top cover, a helical pressing core, a disk cutter and container;
   whereby the disk cutter is mountable on the container, the helical pressing core is locatable within the disk cutter, the top cover is mountable on the disk cutter so as to engage the helical pressing core;
   wherein the top cover includes a spindle that protrudes from a centre of an underside of the top cover and a plurality of projections formed on an outer portion of a peripheral edge on an underside of the top cover;
   the helical pressing core includes a central hollow post to engage securely with the spindle of the top cover and a further hollow post that protrudes from a centre of an underside of the helical pressing core;
   the disk cutter includes a mounting post to engage freely with the further hollow post of the helical pressing core, an upper portion to receive the peripheral edge of the top cover, a plurality of protruding arcs formed on an inside of an upper portion of the disk cutter to engage securely with the plurality of projections formed on the peripheral edge of the top cover and a plurality of projections formed on an outside of a peripheral edge at a bottom of the disk cutter;
   and the container includes an upper portion to receive the peripheral edge of the disk cutter and a plurality of protruding arcs formed on an inside of the upper portion of the container to engage securely with the plurality of projections formed on the peripheral edge of the disk cutter.

2. An ice-grinding device as claimed in claim 1 wherein the top cover includes a rotatable handle that is drivably interconnected with the spindle such that when the spindle engages securely with the central hollow post the helical pressing core rotates as the handle rotates.

3. An ice-grinding device as claimed in claim 2 wherein the helical pressing core includes a surface arranged helically around the central hollow post forming a passage along which ice can be pressed so as to move under the rotation of the helical pressing core and an opening in the base of the helical pressing core from which pressed ice may fall.

4. An ice-grinding device as claimed in claim 1 wherein the disk cutter includes an opening through which a selected blade protrudes and ground ice may fall, a blade plate on which a plurality of different blades are disposed, a blade-selecting means to select a particular blade and a blade-locking device to lock the selected blade in position.

5. An ice-grinding device as claimed in claim 4 wherein the blade plate includes a plurality of pressure plates fixed on a plate; and a plurality of blades with different rakes, whereby a blade is mounted on an upperside of each of the pressure plates and the blade plate co-operates with the blade-selecting means and blade-locking device.

6. An ice-grinding device as claimed in claim 5 wherein the blade-selecting means includes a blade-selecting tab formed on the plate of the blade plate and arranged so that the plate can be moved so the selected blade is positioned adjacent the opening in the disk cutter.

7. An ice-grinding device as claimed in claim 6 wherein the blade-locking device includes:
   an elongate shaft,
   a small cylindrical portion,
   a joining part and
   a blade-locking handle that are arranged so that when the blade-locking handle is rotated the elongate shaft applies pressure to the pressure plate of the selected blade to force the selected blade through the opening in the disk cutter.

8. An ice-grinding device as claimed in claim 1 wherein the top cover includes an opening through which lumps of ice may be fed into the device and a cover shaped to mate with and close the opening.

9. An ice-grinding device comprising a top cover, a helical pressing core, a disk cutter and container, whereby the disk cutter is mountable on the container, the helical pressing core is locatable within the disk cutter, the top cover is mountable on the disk cutter so as to engage the helical pressing core and wherein the disk cutter includes:
   an opening through which a selected blade protrudes and ground ice may fall;
   a blade plate on which a plurality of different blades are disposed;
   a blade-selecting means to select a particular blade; and
   a blade-locking device to lock the selected blade in position.

10. An ice-grinding device as claimed in claim 9 wherein the top cover includes a spindle that protrudes from a centre of an underside of the top cover and a plurality of projections formed on an outer portion of a peripheral edge on an underside of the top cover; the helical pressing core includes a central hollow post to engage securely with the spindle of the top cover and a further hollow post that protrudes from a centre of an underside of the helical pressing core;

the disk cutter includes a mounting post to engage freely with the further hollow post of the helical pressing core, an upper portion to receive the peripheral edge of the top cover, a plurality of protruding arcs formed on an inside of an upper portion of the disk cutter to engage securely with the plurality of projections formed on the peripheral edge of the top cover and a plurality of projections formed on an outside of a peripheral edge at a bottom of the disk cutter; and the container includes an upper portion to receive the peripheral edge of the disk cutter and a plurality of protruding arcs formed on an inside of the upper portion of the container to engage securely with the plurality of projections formed on the peripheral edge of the disk cutter.

11. An ice-grinding device as claimed in claim 10 wherein the top cover includes a rotatable handle that is drivably interconnected with the spindle such that when the spindle engages securely with the central hollow post the helical pressing core rotates as the handle rotates.

12. An ice-grinding device as claimed in claim 11 wherein the helical pressing core includes a surface arranged helically around the central hollow post forming a passage along which ice can be pressed so as to move under the rotation of the helical pressing core and an opening in the base of the helical pressing core from which pressed ice may fall.

13. An ice-grinding device as claimed in claim 9 wherein the blade plate includes a plurality of pressure plates fixed on a plate; and a plurality of blades with different rakes, whereby a blade is mounted on an upperside of each of the pressure plates and the blade plate co-operates with the blade-selecting means and blade locking device.

14. An ice-grinding device as claimed in claim 13 wherein the blade-selecting means includes a blade-selecting tab formed on the plate of the blade plate and arranged so that the plate can be moved so the selected blade is positioned adjacent the opening in the disk cutter.

15. An ice-grinding device as claimed in claim 14 wherein the blade-locking device includes:

a elongate shaft, a small cylindrical portion, a joining part; and a blade-locking handle that are arranged so that when the blade-locking handle is rotated the elongate shaft applies pressure to the pressure plate of the selected blade to force the selected blade through the opening in the disk cutter.

16. An ice-grinding device as claimed in claim 9 wherein the top cover includes an opening through which lumps of ice may be fed into the device and a cover shaped to mate with and close the opening.

* * * * *